(12) United States Patent
Beaulieu

(10) Patent No.: US 11,427,075 B2
(45) Date of Patent: Aug. 30, 2022

(54) SECONDARY CONTAINMENT FUEL TANK ASSEMBLY AND METHOD

(71) Applicant: ATELIER GÉRARD BEAULIEU INC., St-Quentin (CA)

(72) Inventor: Marc Beaulieu, St-Quentin (CA)

(73) Assignee: ATELIER GERARD BEAULIEU INC., St. Quentin (CA)

(*) Notice: Subject to any disclaimer, the term of this patent is extended or adjusted under 35 U.S.C. 154(b) by 349 days.

(21) Appl. No.: 16/451,114

(22) Filed: Jun. 25, 2019

(65) Prior Publication Data

US 2019/0389303 A1 Dec. 26, 2019

Related U.S. Application Data

(60) Provisional application No. 62/763,589, filed on Jun. 25, 2018.

(51) Int. Cl.
*B60K 15/067* (2006.01)
*B65D 90/58* (2006.01)
(Continued)

(52) U.S. Cl.
CPC .......... *B60K 15/067* (2013.01); *B65D 90/125* (2013.01); *B65D 90/587* (2013.01);
(Continued)

(58) Field of Classification Search
CPC ...... B60K 15/067; B60K 15/07; B60K 15/06; B60K 15/035; B60K 15/063; B60K 2015/03118; B60K 2015/03151; B60K 2015/03164; B60K 2015/03447; B60K 2015/03217; B60K 2015/03144; B65D 90/125; B65D 90/587; B65D 90/16; B65D 90/008; B65D 1/22; B65D 1/24;
(Continued)

(56) References Cited

U.S. PATENT DOCUMENTS 3,004,682 A * 10/1961 Bertolini .............. B65D 90/008
220/1.5
3,383,078 A * 5/1968 Shohet ................... B64D 37/04
244/135 R
(Continued)

FOREIGN PATENT DOCUMENTS

WO 2017163661 A1 9/2017

OTHER PUBLICATIONS

Office Action dated Jan. 22, 2021, Canadian Patent Application Serial No. 3,047,472.
(Continued)

*Primary Examiner* — Glenn F Myers
(74) *Attorney, Agent, or Firm* — Alexandre Daoust; Norton Rose Fulbright Canada LLP

(57) ABSTRACT

A fuel tank assembly includes a shell defining an opening therein, an access panel connectable to the shell and movable between a closed position where the opening is closed and an open position where the opening is open, and a fuel tank disposed in the shell and slidably engaged with the shell. The fuel tank and the opening are dimensioned such that the fuel tank is slidable out of the shell via the opening when the access panel is in the open position. A generator assembly and a method of servicing a fuel tank of a generator are also described.

16 Claims, 6 Drawing Sheets

(51) Int. Cl.
*B65D 90/12* (2006.01)
*B60K 15/03* (2006.01)

(52) U.S. Cl.
CPC ............... *B60K 2015/03118* (2013.01); *B60K 2015/03151* (2013.01)

(58) Field of Classification Search
CPC .......... B65D 1/246; B65D 3/26; B65D 3/261; B65D 88/12; B65D 88/121; B65D 88/129; B65D 88/546; F02B 63/04; F02B 63/00; F02B 63/044; F02B 2063/045
See application file for complete search history.

(56) References Cited

U.S. PATENT DOCUMENTS

| | | |
|---|---|---|
| 4,698,975 A | 10/1987 | Tsukamoto et al. |
| 4,960,222 A | 10/1990 | Fields, III |
| 6,520,124 B2 | 2/2003 | Bohm, II |
| 2010/0108711 A1* | 5/2010 | Wietgrefe .............. B65D 88/30 222/1 |
| 2015/0107682 A1 | 4/2015 | Kirk et al. |
| 2015/0291133 A1* | 10/2015 | Hidalgo Balboa .. B60K 15/067 414/573 |
| 2015/0292434 A1* | 10/2015 | Yamanaka .............. F02B 63/04 60/670 |
| 2016/0145040 A1* | 5/2016 | Bowser ................. B60P 1/6481 220/1.5 |
| 2019/0176615 A1* | 6/2019 | Lewin ................. B60K 15/067 |
| 2019/0257073 A1* | 8/2019 | Ledoux ................. E04B 1/3483 |

OTHER PUBLICATIONS

Examiner's Requisition dated Apr. 22, 2020 for corresponding Canadian patent application 3,047,472.
Base Mounted Fuel Tanks, https://www.americasgenerators.com/Base-Mounted-Fuel-Tanks-Americas-Generators.aspx, Sep. 23, 2019.
Fuel Tank for Power Generators, http://www.hennig-enclosure-systems.com/index.php/fuel-tanks/, Apr. 25, 2019.

* cited by examiner

SECONDARY CONTAINMENT FUEL TANK ASSEMBLY AND METHOD

CROSS-REFERENCE TO RELATED APPLICATIONS

This application claims priority from U.S. patent application 62/763,589 filed on Jun. 25, 2018. Its content is hereby incorporated herein in its entirety.

TECHNICAL FIELD

This disclosure relates to fuel tank assemblies for generators.

BACKGROUND OF THE ART

Prior art fuel tanks for generators are typically suitable for their intended purposes, but do provide certain inconveniences for users. For example, in at least some applications, generator fuel tanks need to be inspected at one or more given time intervals. To be inspected, at least some prior art generator fuel tanks may require the generator to be detached from the fuel tank, and this may require a material amount of time and energy on the part of service personnel. As another example, in at least some applications and jurisdictions, double-wall fuel tanks may be required by regulation and each fuel tank may be required to be equal to or smaller than a certain regulation-specified maximum volume. In at least some such cases, multiple prior art double-wall fuel tanks may need to be manufactured and installed for a given generator in order to provide for a desired amount of fuel capacity for that generator. In at least some cases, such installations may require a relatively large number of parts, and may therefore be expensive and relatively difficult to maintain and inspect.

In view of the foregoing, improvements to prior art fuel tanks for generators are desirable.

SUMMARY

In accordance with one aspect, there is provided a fuel tank assembly, comprising: a shell defining an opening therein; an access panel connectable to the shell and movable between a closed position where the opening is closed and an open position where the opening is open; and a fuel tank disposed in the shell and slidably engaged with the shell, the fuel tank and the opening being dimensioned such that the fuel tank is slidable out of the shell via the opening when the access panel is in the open position.

In some embodiments, the opening, the access panel, and the fuel tank are a first opening, a first access panel, and a first fuel tank, respectively; the shell defines a second opening therein; a second access panel is connectable to the shell and movable between a closed position where the second opening is closed and an open position where the second opening is open; and a second fuel tank is disposed in the shell and slidably engaged with the shell, the second fuel tank and the second opening being dimensioned such that the second fuel tank is slidable out of the shell via the second opening when the second access panel is in the open position.

In some embodiments, the first opening is opposite the second opening.

In some embodiments, the first and second fuel tanks are dimensioned to occupy a majority of the shell.

In some embodiments, the first and second fuel tanks are dimensioned to define an access space therebetween when disposed in the shell, and the shell defines an opening through a top of the shell that opens into the access space.

In some embodiments, the first and second fuel tanks each include a fuel quick-connect fitting that is disposed at least in part in the access space when the first and second fuel tanks are disposed in the shell.

In some embodiments, the shell defines a testing aperture therein at a location proximate to the opening, and the fuel tank assembly includes a cap removably attachable to the shell to close the testing aperture.

In some embodiments, the shell includes a generator mounting interface on a top side thereof.

In some embodiments, the access panel and the shell are structured such that the access panel fluidly seals the opening while being removably connected to the shell to cover the opening.

In some embodiments, the fuel tank assembly comprises a spacer disposed between the fuel tank and a bottom of the shell, the fuel tank being disposed on the spacer when inside the shell.

In some embodiments, the spacer includes a rail comprising a friction-reducing material.

In some embodiments, the spacer is sized to define a gap between the fuel tank and the bottom of the shell, the gap being dimensioned to receive a fork of a forklift therein when the access panel is in the open position.

In accordance with another aspect, there is provided a generator assembly, comprising: a shell defining an opening therein; a generator disposed on top of the shell; an access panel connectable to the shell and movable between a closed position where the opening is closed and an open position where the opening is open; and a fuel tank disposed in the shell and slidably engaged with the shell, the fuel tank being operatively connected to the generator to supply fuel to the generator, the fuel tank and the opening being dimensioned such that the fuel tank is slidable out of the shell via the opening when the access panel is in the open position and the fuel tank is disconnected from the generator.

In some embodiments, the opening, the access panel, and the fuel tank are a first opening, a first access panel, a first fuel tank, respectively; the shell defines a second opening therein; a second access panel is connectable to the shell and movable between a closed position where the second opening is closed and an open position where the second opening is open; and a second fuel tank is disposed in the shell and is slidably engaged with the shell, the second fuel tank being operatively connected to the generator to supply fuel to the generator, the second fuel tank and the second opening being dimensioned such that the second fuel tank is slidable out of the shell via the second opening when the second access panel is in the open position and the second fuel tank is disconnected from the generator.

In some embodiments, the first opening is opposite the second opening, the first and second fuel tanks are dimensioned to define an access space therebetween when disposed in the shell, and the shell defines an opening through a top of the shell that opens into the access space, the opening being accessible while the generator is disposed on the top of the shell.

In accordance with yet another aspect, there is provided a method of servicing a fuel tank of a generator, comprising: opening an access panel connected to a shell that encloses the fuel tank and supports the generator on a top of the shell, to open an opening in a side of the shell; sliding the fuel tank out of the shell via the opening; performing at least one of maintenance and inspection of the fuel tank while the fuel tank is disposed outside of the shell; sliding the fuel tank back into the shell via the opening; and closing the opening with the access panel.

In some embodiments, the method further comprises: prior to the sliding the fuel tank out of the shell, disconnecting the fuel tank from the generator; and after the sliding the fuel tank back into the shell, reconnecting the fuel tank to the generator.

In some embodiments, the sliding the fuel tank out of the shell includes inserting a fork of a forklift into a gap between the fuel tank and a bottom of the shell via the opening, lifting at least a part of the fuel tank relative to the shell, and at least in part sliding the fuel tank out of the opening on the fork.

In some embodiments, the opening the access panel is performed simultaneously with the sliding the fuel tank out of the shell.

In some embodiments, the disconnecting and the reconnecting the fuel tank is executed via an opening defined in the top of the shell while the generator remains disposed on the top of the shell.

Many further features and combinations concerning the present improvements will appear to those skilled in the art following a reading of the instant disclosure.

DETAILED DESCRIPTION

Figure 1:
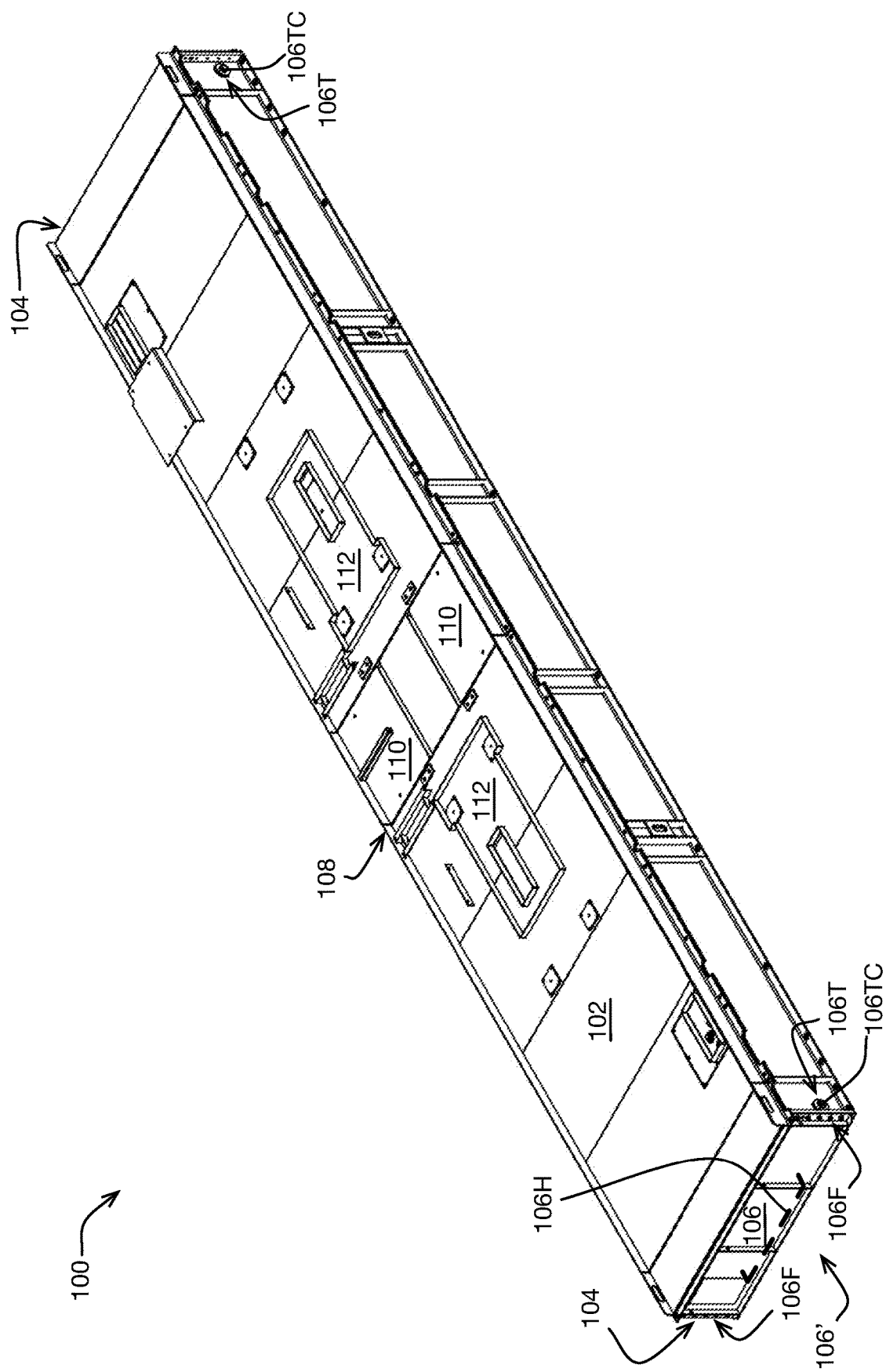
FIG. 1 is a perspective view of an example of a fuel tank assembly.
Figure 2:
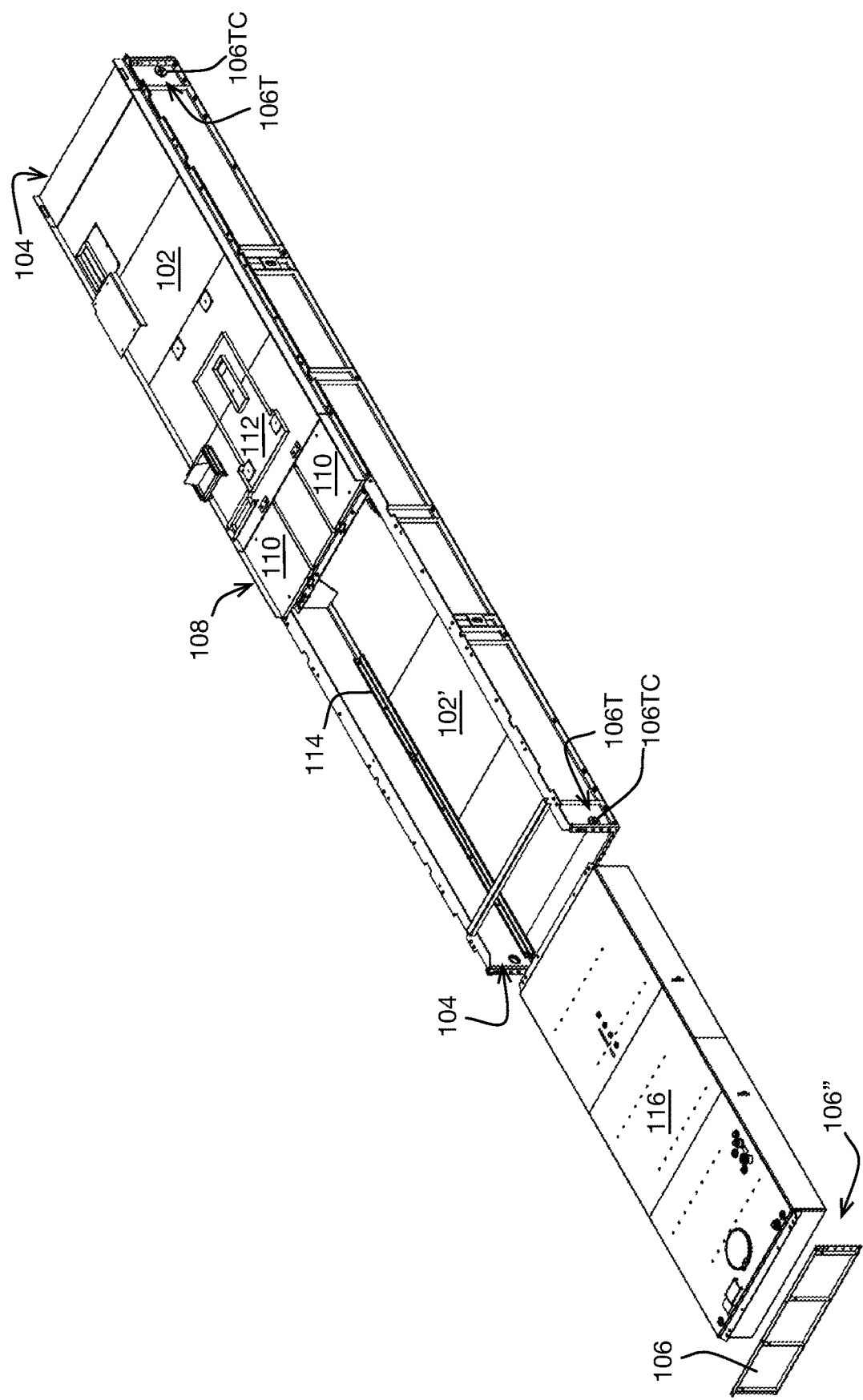
FIG. 2 is a partially exploded perspective view of the fuel tank assembly of FIG. 1, with a side access panel thereof being in an open position.

FIGS. 1 and 2 show an example of a fuel tank assembly 100. While the fuel tank assembly 100 is illustrated as being used with a top-mounted generator (GEN) (FIG. 5), it is contemplated that the fuel tank assembly 100 may be used in other applications as well.

As shown, the fuel tank assembly 100 includes a fuel-impermeable shell 102. The shell 102 is constructed out of interconnected sheet metal parts with suitable seals, so as to be impermeable to fuel, such as diesel. One example of suitable seals are conventional resilient seals disposed between corresponding interconnected sheet metal parts of the shell 102. It is contemplated that any suitable construction and manufacturing method may be used to produce the shell 102, so long as the shell 102 may keep fuel that may leak into the bottom of the shell 102 from leaking out of the shell 102 into the environment. As a non-limiting example, in some embodiments, at least part of the shell 102 may be made from a single piece of sheet metal bent to shape and welded at the resulting seams. This may allow to at least reduce the number of seals used to make the shell 102. While a rectangular shape of the shell 102 is used in the illustrated embodiment, a different shape may be used.

Figure 4:
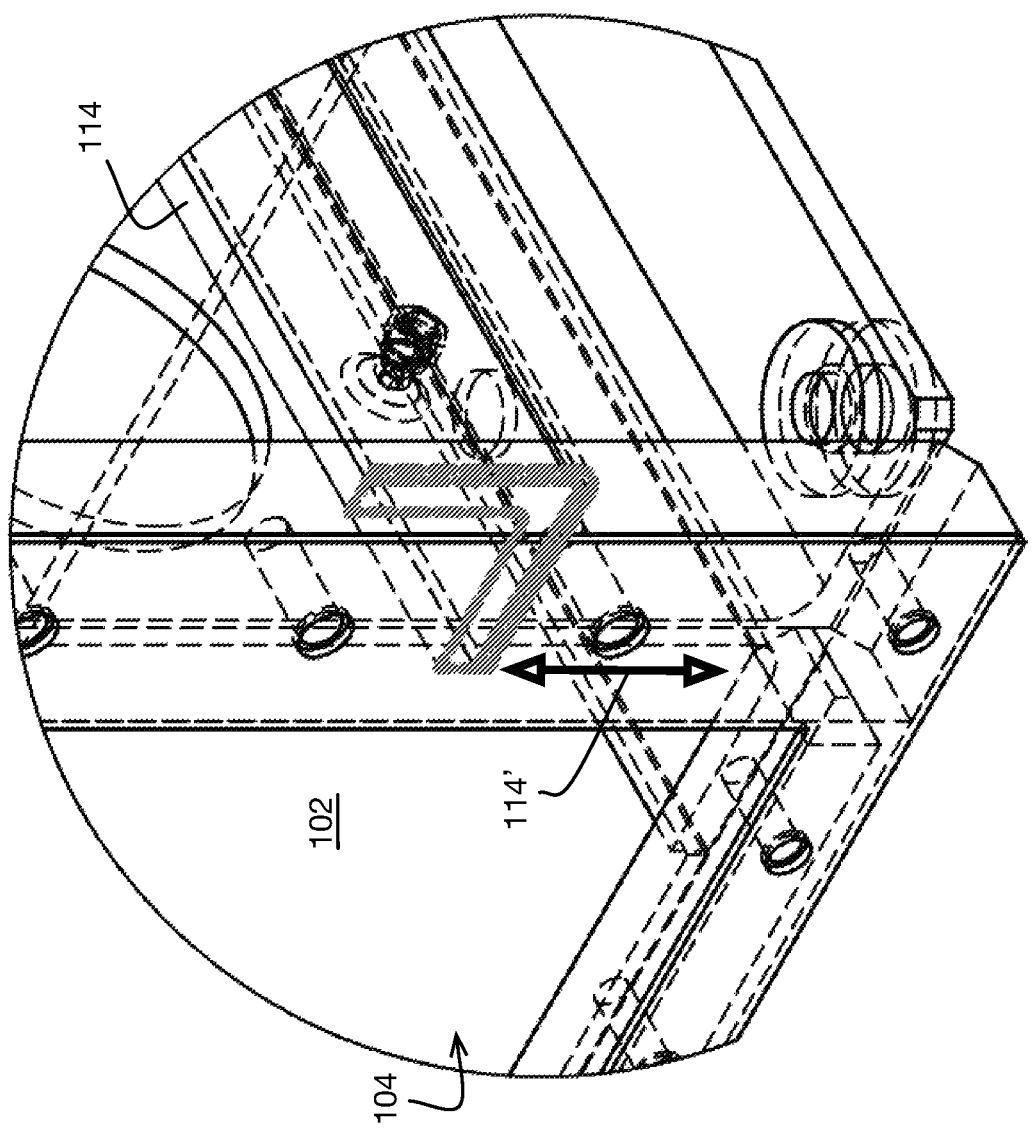
FIG. 4 is a close-up detail view of a part of the shell of FIG. 3.

As shown, in the present embodiment, the shell 102 defines openings 104 in opposite sides thereof. The openings 104 are therefore opposite to each other in this embodiment. The openings 104 are closed with respective access panels 106. The access panels 106 are connected to the shell 102. While this need not be the case in other embodiments, in the present embodiment, the openings 104 are mirror images of each other, as are the access panels 106. Therefore, only the opening 104 and its respective access panel 106 that are fully visible in FIGS. 1 and 4 are described in detail.

Referring to FIGS. 1 and 2, the access panel 106 is movable between a closed position 106' (FIG. 1) where the access panel 106 closes its corresponding opening 104 (i.e. where the opening 104 is closed) and an open position 106" (FIG. 2) where the corresponding opening 104 is open. In the closed position 106', the access panel 106 is removably connected to the shell 102 via fasteners 106F, such as bolts and/or screws and/or the like received through the access panel 106 and into corresponding apertures defined in the shell 102 in locations that are distributed along parts of the periphery of the corresponding opening 104. In the present embodiment, in the closed position 106' the access panel 106 seals the opening 104 so that the interface between the access panel 106 and the opening 104 is impermeable to fuel.

To provide the fuel-impermeable seal, a conventional resilient seal (not labeled) disposed in the interface between the access panel 106 and the opening 104 is used. However, other seal types are also contemplated. For testing the fuel-impermeable seal, the shell 102 defines a testing aperture 106T therein at a location proximate to the opening 104, and a cap 106TC is removably attached to the shell 102 to close the testing aperture 106T. In this embodiment, the cap 106TC is provided by a bolt 106TC threaded into the testing aperture 106T. However, a different type of the cap 106TC and/or a different attachment between the cap 106TC and the shell 102 may be used.

Once the access panel 106 is secured in its closed position 106', the seal between the periphery of the access panel 106 and the opening 104 may be tested by removing the cap 106TC from the testing aperture 106T, adding a liquid (such as soapy water for example) over the seal, and introducing pressurized air directed toward the inner periphery of the seal via the testing aperture 106T. Pressurized air may be provided from any suitable pressure source, such as from an air compressor coupled to an air hose. During this procedure, absence of bubbles forming in the liquid disposed over the seal may be indicative of the seal being fuel-impermeable. Once this testing is completed, the cap 106TC may be reinstalled, and may thus seal the testing aperture 106T. In some embodiments, the testing aperture 106T may be omitted.

Referring to FIG. 2, in the present embodiment, to move the access panel 106 to its open position 106", the fasteners 106F securing the access panel 106 to the shell 102 are removed at least from the shell 102. The access panel 106 is then removed from the shell 102. The fasteners 106F and the removable connection between the access panel 106 and the corresponding opening 104 provide one non-limiting example of how the access panel 106 may be connectable to the shell 102 and movable between the closed position 106' where the opening 104 is closed and the open position 106" where the opening 104 is open. Other constructions may also be used.

As a non-limiting example, in some embodiments, the access panel 106 may be hinged to the shell 102 on one side of the opening 104, or along at least a part of the bottom edge of the opening 104 for example, so as to pivot between its closed position 106' and its open position 106". In some such embodiments, one or more fasteners 106F, or other locking mechanism(s), such as a latch for example, may be used to selectively lock the access panel 106 in the closed position 106'. In such embodiments, the hinge(s) and the locking mechanism(s), may be sized, shaped, and positioned so as to not interfere with fuel tank removal via the opening 104, as that functionality is described in detail below. As yet another non-limiting example, the access panel 106 may be receivable in its closed position 106' via a plurality of guide pins, such as conventional guide pins for example. Such guide pins may be for example attached to the shell 102 at locations proximate to the corresponding opening 104.

Figure 3:
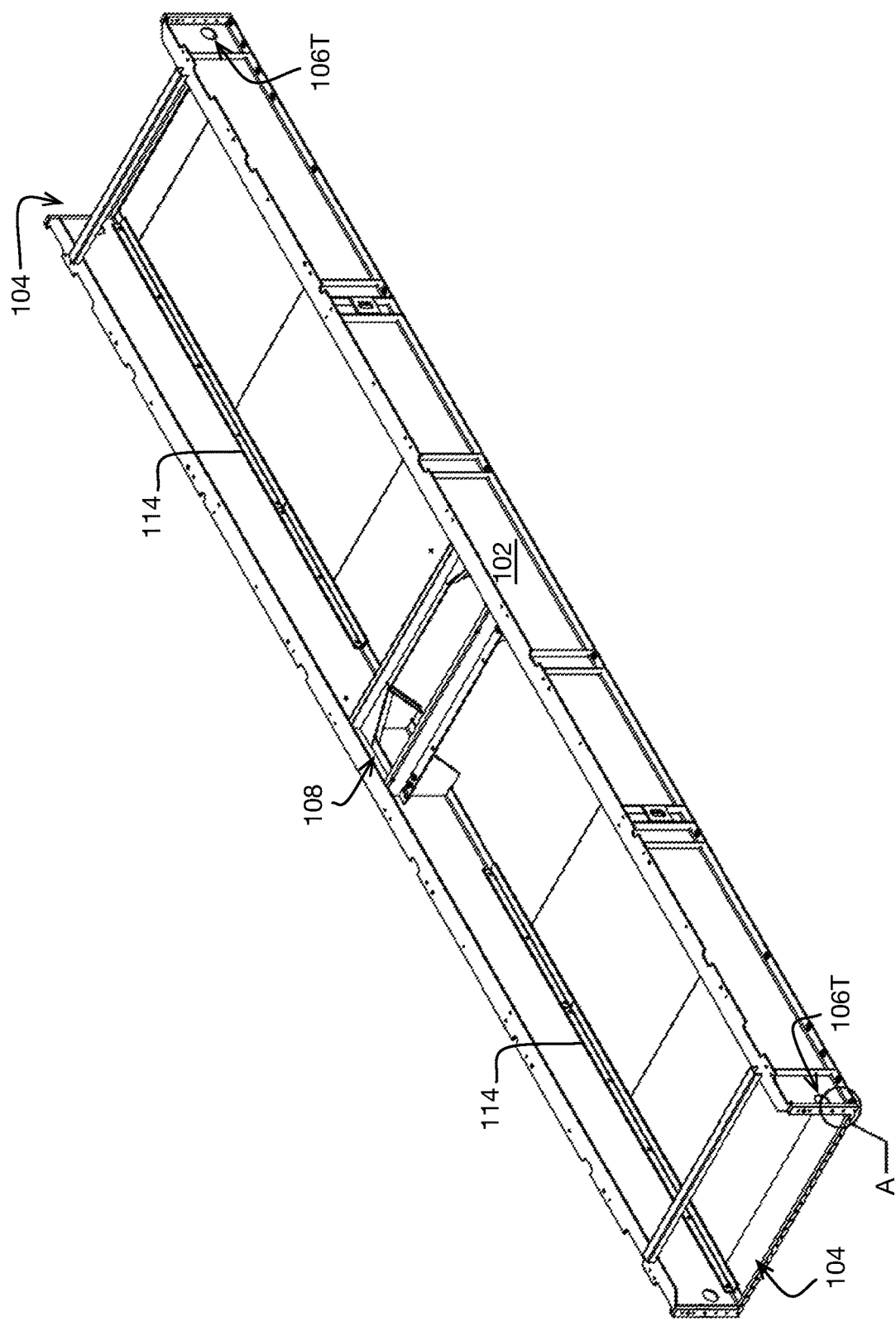
FIG. 3 is a perspective view of a shell of the fuel tank assembly of FIG. 1.

Now referring to FIGS. 2 and 3, in the present embodiment, the shell 102 defines two access openings 108 in a top side thereof. In this embodiment, the access openings 108 are defined in a middle portion of the top side of the shell 102, proximate respective long edges of the top side of the shell 102. As best shown in FIG. 1, the access openings 108 are closed with respective access panels 110 that are removably connected to the respective parts of the top side of the shell 102 using any suitable connecting mechanism(s) (not labeled), such as fasteners. As will be explained in more detail below, in use, the access openings 108 provide service access to into the shell 102. In this embodiment, the interfaces between the access panels 110 and the respective access openings 108 are not sealed to fuel; however, they may be in other embodiments. While in this embodiment, the shell 102 has two access openings 108 with two corresponding access panels 110, in other embodiments the shell 102 may have a different number and/or combination of access opening(s) 108 and access panel(s) 110.

Referring briefly back to FIGS. 1 and 2, the shell 102 further includes a generator mounting interface 112 on the top side thereof. The generator mounting interface 112 is structured to connect a generator (GEN) (see FIG. 5) to the top of the shell 102. To this end, the generator mounting interface 112 may be of any suitable construction, such as a conventional construction. In some embodiments, the generator mounting interface 112 may be structured to connect multiple generators (GEN) to the top of the shell 102. The shell 102 and the generator mounting interface 112 include structural supports and/or are structured and are appropriately sized, for example according to conventional engineering principles, so as to support a weight of the generator(s) (GEN) on top of the shell 102. In other embodiments and/or applications of the fuel tank assembly 100, such as in applications where the fuel tank assembly 100 is used with respect to a different type of fuel-consuming engine and/or is remote to the generator(s) (GEN), the generator mounting interface(s) 112 may be omitted.

Now referring to FIGS. 3 and 4, four rails 114 are attached to the shell 102 inside the shell 102, in this embodiment generally parallel to the bottom of the shell 102. Although this need not be the case, in this embodiment, the two rails 114 on the left side of the shell 102 are mirror images of the two rails 114 on the right side of the shell 102. Therefore, the two rails 114 on the right side of the shell 102 are not shown or described in detail.

Figure 5:
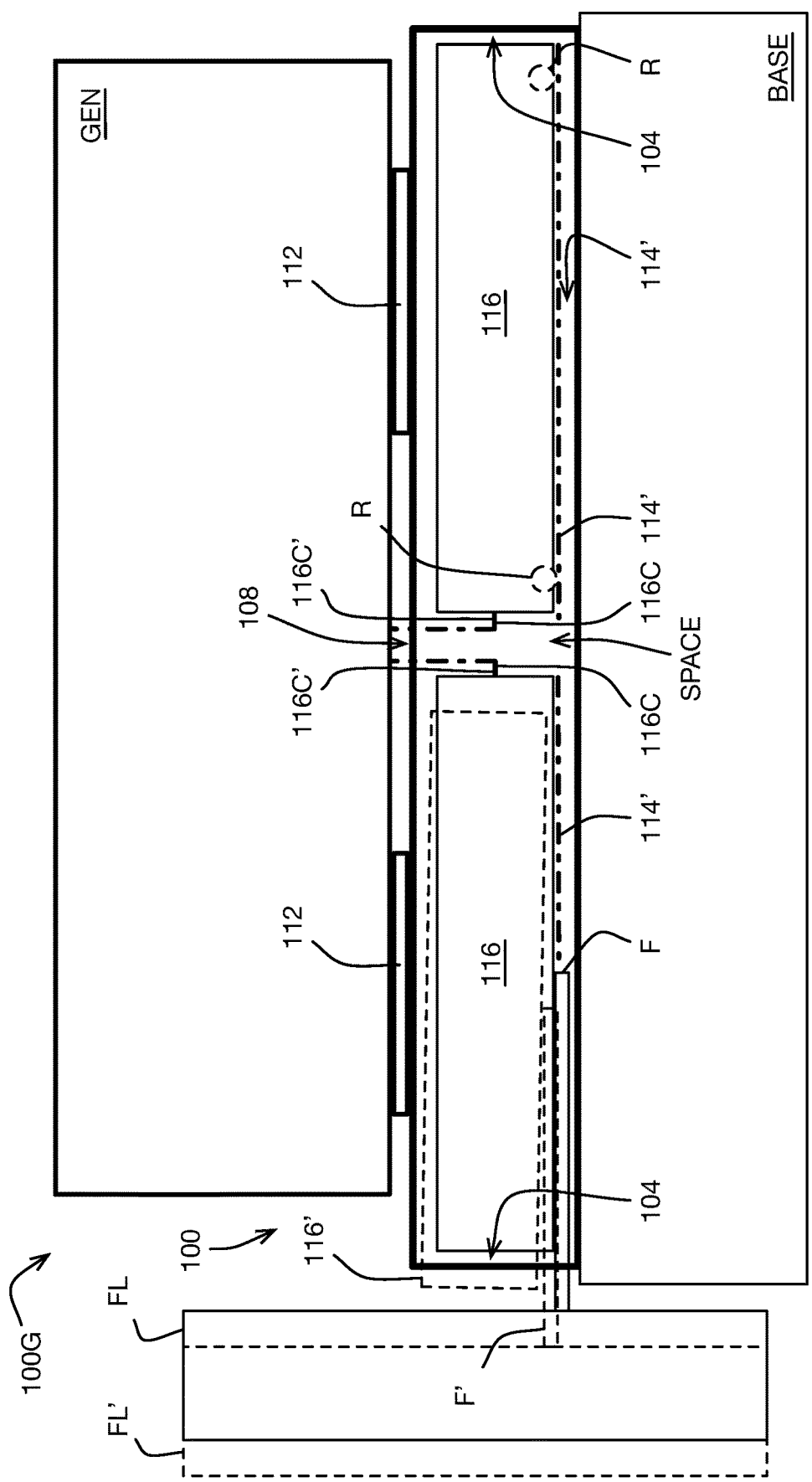
FIG. 5 is a schematic side elevation view of the fuel tank assembly of FIG. 1, with the fuel tank assembly being implemented in a generator assembly.

Now referring to FIG. 5, a generator assembly 100G is shown. In this non-limiting example, the four rails 114 in the shell 102 slidably receive two fuel tanks 116 thereon. In the illustrated embodiment, one of the fuel tanks 116 is received on the two rails 114 corresponding to one of the openings 104 in the shell 102 and the other one of the fuel tanks 116 is received on the two rails 114 corresponding to the other one of the openings 104 in the shell 102. The fuel tanks 116 are therefore slidably engaged with the shell 102 and are disposed in the shell 102 which provides a secondary containment for the fuel in the fuel tanks 116. As shown, in this embodiment the fuel tanks 116 are dimensioned to occupy a majority of the shell 102 when received in the shell 102. In an aspect, such dimensioning may help increase a fuel volume that may be provided by a given embodiment of the fuel tank assembly 100 while complying with local regulation(s) that may place limits on fuel volume that may be held by a single fuel tank in a given jurisdiction for which the fuel tank assembly 100 may be designed.

As shown schematically with dashed lines 116C, each of the fuel tanks 116 is operatively connected to a generator (GEN) supported on the top of the shell 102, to supply fuel to the generator (GEN). To this end, any suitable fuel connector(s), fuel line(s), and any other additional fittings and filter(s) for example, may be used depending on each particular embodiment and application of the fuel tank assembly 100 and the generator assembly 100G. The access openings 108 in the top of the shell 102 may be used to manually make these fuel connections, using conventional engineering principles and techniques for example. The fuel connections 116C are shown in FIG. 5 in one non-limiting example configuration/arrangement. Any suitable arrangement of fuel connection(s) 116C may be used to suit each particular embodiment and application of the fuel tank assembly 100 and the generator assembly 100G.

In this embodiment, the rails 114 are coated with Teflon™ to reduce friction between each of the fuel tanks 116 and the corresponding ones of the rails 114. This may help reduce an amount of energy that may be required to slide/move the fuel tanks 116 into and out of the shell 102 via the respective openings 104 in the shell 102, when the respective access panels 106 are in the open position 106". Teflon™ is one example of a friction-reducing material that may be used. Other friction-reducing material(s) may be used instead of or in combination with Teflon™. In other embodiments, a different number of rails 114, such as a single rail 114 on each side of the shell 102 may be used. The rails 114 are one non-limiting example of a spacer that may be used to support the fuel tanks 116 inside the shell 102. It is contemplated that another type and/or combination of spacer(s) may be used instead of or in combination with rails 114. For example, in other embodiments, one or more rollers (R) (shown with respect to only one of the fuel tanks 116 in FIG. 5, to maintain clarity) attached to the fuel tanks 116 and/or the shell 102 may be used instead of or in combination with the rails 114 for making the fuel tanks 116 easier to slide in and out of the shell 102. In a particular non-limiting example, rollers (R) could be attached to the shell 102, and the rails 114 could be attached to the fuel tanks 116 to serve as rolling surfaces for the rollers (R) to roll on, for making the fuel tanks 116 easier to slide in and out of the shell 102. The rollers (R) are an example of engagement members. It's contemplated that other engagement members, such as non-rolling engagement members, could be used. Yet other friction-reducing sliding arrangements are likewise contemplated.

As best shown in FIGS. 3 and 5, to further help reduce an amount of energy required to slide the fuel tanks 116 into and out of the shell 102, the rails 114, and/or the other mechanism/arrangement used, is/are spaced from the bottom of the shell 102, and/or dimensioned, to define a gap 114' between the fuel tank(s) 116 and the bottom of the shell 102. More particularly, as shown schematically in FIG. 5, the gap 114' is dimensioned to receive a fork (F) of a forklift (FL)

therein via any one of the openings 104, when the respective access panel 106 is in the open position 106". To allow for sufficient ground clearance for the forklift (FL), as shown in FIG. 5, the shell 102 may be disposed on a base (BASE). In some embodiments, the base (BASE) may be a rail car or a metal or concrete foundation disposed on the ground for example. The base (BASE) may be different depending on each particular application of the fuel tank assembly 100, and may be omitted. Since the fork (F) and the forklift (FL) may be any conventional fork (F) and forklift (FL), these elements are not shown or described in detail.

As shown in FIG. 5 with corresponding dashed lines labelled (F'), (FL') and 116', once the fork (F) is inserted into the gap 114' under one of the fuel tanks 116, the forklift (FL) may lift at least a part of the fuel tank 116, inside the shell 102, relative to the shell 102, and may at least in part slide the fuel tank 116 out of the opening 104 on the fork (F). In some applications and embodiments of the fuel tank assembly 100, the fuel tank 116 may be taken out of the shell 102 in its entirety using solely the fork (F) and the forklift (FL). For example, in some such embodiments, the fuel tank 116 may be sized sufficiently small so as to be supported in its entirety on the fork (F). In other applications and embodiments of the fuel tank assembly 100, once the forklift (FL) moves at least a part of the fuel tank 116 out of the shell 102 via the corresponding opening 104, the rest of the fuel tank 116 may be moved out of the shell 102 using manual handling for example.

Any suitable means, such as using the fork (F) and the forklift (FL), may be used to reinsert/slide the fuel tank(s) 116 back into the shell 102. When received in their respective positions in the shell 102, the fuel tanks 116 may be manually fluidly reconnected to the generator GEN using the fuel connections 116C, via the access opening(s) 108 in the top of the shell 102, while the generator GEN is disposed on the shell 102.

Still referring to FIG. 5, to further facilitate connecting and disconnecting the fuel tanks 116, the fuel tanks 116 are dimensioned to define an access space (SPACE) therebetween when disposed in the shell 102, so that the access opening(s) 108 in the top of the shell 102 open into the access space (SPACE). In some embodiments, the access space (SPACE) may be sized to receive therein a diesel exhaust fluid (DEF) tank, such as a conventional DEF tank for example. In some embodiments, the access space (SPACE) may facilitate connecting and disconnecting the fuel tanks 116, and to further decrease an amount of energy required to slide the fuel tanks 116 into and out of the shell 102, each of the fuel tanks 116 includes a fuel quick-connect fitting 116C' that is disposed at least in part in the access space (SPACE) when the fuel tanks 116 are disposed in the shell 102. The fuel quick-connect fittings 116C' may be any suitable conventional fuel quick-connect fittings, and in this embodiment are part of the fuel connections 116C described above.

More particularly, in the present embodiment, the fuel quick-connect fittings 116C' are conventional fuel quick-connect fittings 116C' that are selected and positioned relative to the respective ones of the fuel tanks 116 so as to allow the fuel tanks 116 to be removed out of the shell 102 via the respective openings 104 after the fuel tanks 116 are fluidly disconnected (using the fuel quick-connect fittings 116C') from the generator (GEN), without removing the fuel quick-connect fittings 116C' from the fuel tanks 116. While providing advantages in the present embodiment, in some embodiments, the fuel quick-connect fittings 116C' may be omitted. Also, in some embodiments, the fuel connection(s) 116C between a given fuel tank 116 and the generator(s) (GEN) may be made sufficiently long and flexible so that the given fuel tank 116 may be taken at least sufficiently, and in some embodiments in its entirety, out of the shell 102 via its corresponding opening 104 without disconnecting the given fuel tank 116 from the generator(s) (GEN).

Figure 6:
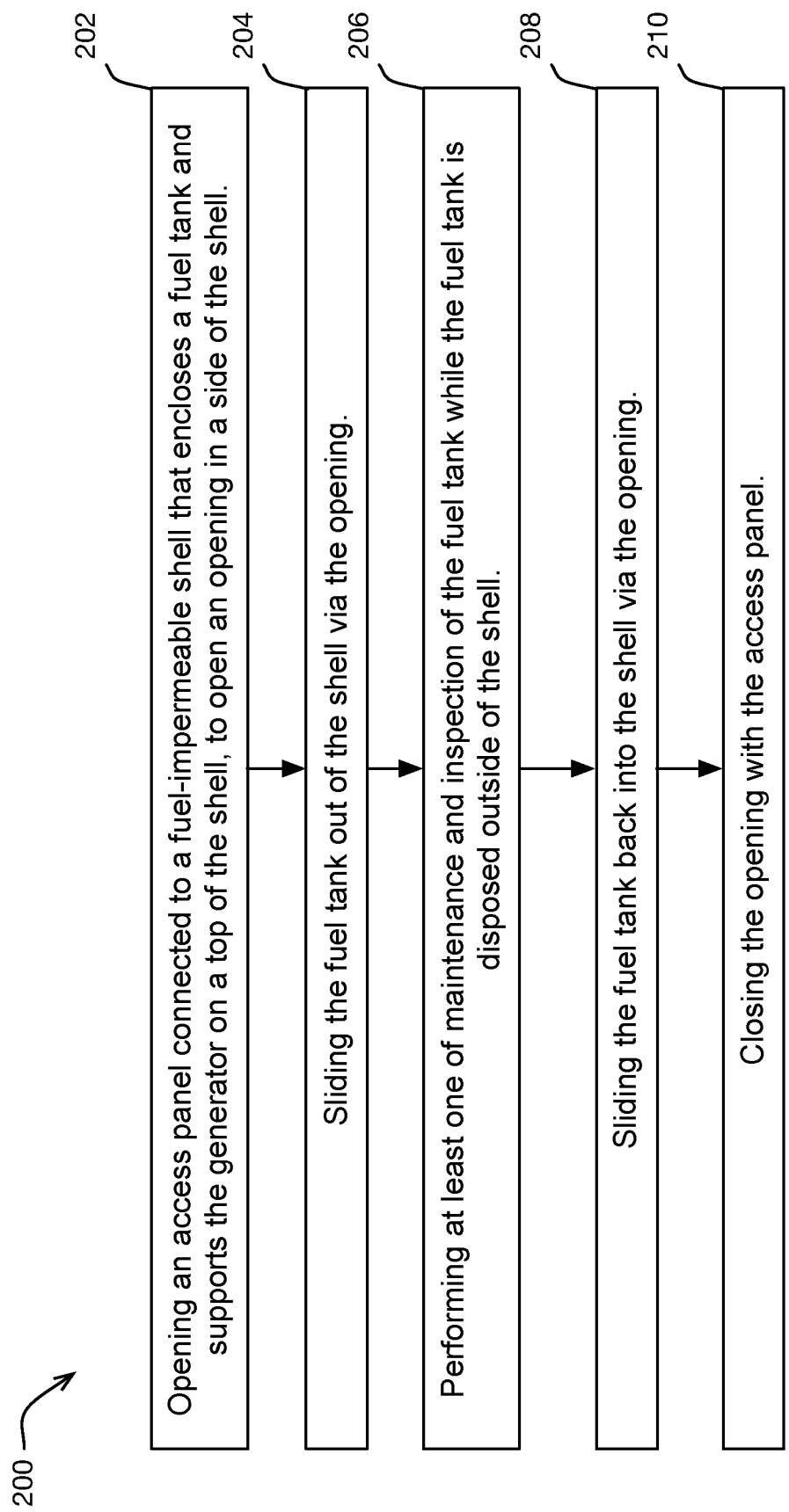
FIG. 6 is a logic flow diagram showing a method of servicing a fuel tank of a generator.

Wth the above structure in mind, and now referring to FIG. 6, the present technology provides a method 200 of servicing a fuel tank 116 of a generator (GEN).

In some embodiments, the method 200 includes a step 202 of opening an access panel 106 connected to a shell 102 that encloses the fuel tank 116 and supports the generator (GEN) on a top of the shell 102, to open an opening 104 in a side of the shell 102. The method 200 may also include a step 204 of sliding the fuel tank 116 out of the shell 102 via the opening 104, a step 206 of performing at least one of maintenance and inspection (using any suitable conventional maintenance and inspection methods) of the fuel tank 116 while the fuel tank 116 is disposed outside of the shell 102, a step 208 of sliding/moving the fuel tank 116 back into the shell 102 via the opening 104, and a step 210 of closing the opening 104 with the access panel 106.

In some embodiments, the method 200 may also include, prior to the sliding the fuel tank 116 out of the shell 102, disconnecting the fuel tank 116 from the generator (GEN), such as by using the fuel quick-connect fitting(s) 116C' corresponding to the fuel tank 116 for example. In some such embodiments, the method 200 may also include, after the sliding the fuel tank 116 back into the shell 102, reconnecting the fuel tank 116 to the generator (GEN), such as again by using the fuel quick-connect fitting(s) 116C' corresponding to the fuel tank 116 for example.

As seen above, in some embodiments, the step 204 of sliding the fuel tank 116 out of the shell 102 includes inserting a fork (F) and the forklift (FL) into a gap 114' between the fuel tank 116 and a bottom of the shell 102 via the opening 104 corresponding to the fuel tank 116, lifting at least a part of the fuel tank 116 relative to the shell 102, and at least in part sliding the fuel tank 116 out of the corresponding opening 104 on the fork (F). Also as seen above, in some embodiments of the method 200, the sliding the fuel tank 116 out of the shell 102 and the sliding the fuel tank 116 back into the shell 102 may be executed while the generator (GEN) remains disposed on the top of the shell 102. In some cases, this helps reduce an amount of energy required to service or inspect the fuel tanks 116.

Further as seen above, in some embodiments of the method 200, the disconnecting and the reconnecting the fuel tank 116 may be executed via an opening, such as one of the access openings 108, defined in the top of the shell 102 while the generator (GEN) remains disposed on the top of the shell 102. To this end, the shell 102 may be dimensioned to provide a sufficient clearance between the sides of at least one generator (GEN) with which the shell 102 may be designed to be used and the lateral sides on the top of the shell 102, and sufficiently large access opening(s) 108.

As can be seen therefore, the examples described above and illustrated are intended to be non-limiting examples only. Many modifications may be made to the embodiments described above without departing from the scope of the present disclosure. For example, while two fuel tanks 116 and two respective openings 104 and access panels 106 are described, the shell 102 may be structured to have a different number of corresponding openings 104, access panels 106, and fuel tanks 116. As an example, in some embodiments, the shell 102 may have a single opening 104 with a single access panel 108, a single corresponding set of rails 114 as described above, and may slidably receive therein a single fuel tank 116.

As another example, while in the illustrated embodiment the shell 102, the openings 104 and the fuel tanks 116 have corresponding rectangular/cuboid shapes, other corresponding shapes may be used, so long as the functionality described herein is provided. As a non-limiting example, it is contemplated that the shell 102 may have a shape of a hexagonal prism having six openings 104 (one in each of the six sides of the shell 102), six access panels 106, and six generally triangular fuel tanks 116 structured to be slidable into and out of the openings 104 and to occupy a majority of the hexagonal shell 102.

As yet another example, in some embodiments, a given access panel 106 of the fuel tank assembly 100 may be connectable to the shell 102 to move between the closed position 106' and the open position 106" by being attached to an outward side (the one closest to the respective opening 104) of a corresponding fuel tank 116 of the fuel tank assembly 100. In such embodiments, in the closed position 106' the access panel 106 may be removably directly attached to the shell 102 via fasteners 106F for example, to provide for the fuel-impermeable interface with the shell 102 as described above.

In such embodiments, the access panel 106 may be movable to the open position 106" by being first disconnected from the shell 102 (e.g. by removing the fasteners 106F) and then being pulled out of the shell 102 together with the fuel tank 116. In such embodiments, the access panel 106 may have one or more attachment features, such as one or more handles and/or hooks 106H (FIG. 1) for example, which may help apply a sufficient pulling force to the access panel 106.

What is claimed is:

1. A fuel tank assembly, comprising:
   a shell including openings therein each permitting access to one of a plurality of fuel tank compartments within the shell, the shell extending longitudinally between opposite sides thereof and the openings spaced longitudinally apart from each other, the fuel tank compartments spaced apart from each other within the shell;
   access panels each connectable to the shell about one of the openings and movable between a closed position where the opening is closed and an open position where the opening is open; and
   one or more fuel tanks configured to receive a fluid therein, each fuel tank disposed in the shell in one of the fuel tank compartments and configured to slidably engage with the shell, each fuel tank configured to slide out of the shell via one of the openings when the corresponding access panel is in the open position.

2. The fuel tank assembly of claim 1, wherein:
   the openings, the access panels, and the one or more fuel tanks include a first opening, a first access panel, and a first fuel tank, respectively;
   the openings and the access panels include a second opening and a second access panel, respectively, the second access panel is connectable to the shell and movable between a closed position of the second access panel where the second opening is closed and an open position of the second access panel where the second opening is open; and
   the one or more fuel tanks include a second fuel tank disposed in the shell in another one of the fuel tank compartments and slidably engaged with the shell, the second fuel tank is slidable out of the shell via the second opening when the second access panel is in the open position.

3. The fuel tank assembly of claim 2, wherein the first opening is opposite the second opening.

4. The fuel tank assembly of claim 3, wherein the first and second fuel tanks are dimensioned to occupy a majority of the shell.

5. The fuel tank assembly of claim 4, wherein the first and second fuel tanks are dimensioned to define an access space therebetween when disposed in the shell, and the shell defines a top opening through a top of the shell that opens into the access space.

6. The fuel tank assembly of claim 5, wherein the first and second fuel tanks each include a fuel quick-connect fitting that is disposed at least in part in the access space when the first and second fuel tanks are disposed in the shell.

7. The fuel tank assembly of claim 1, wherein the shell defines a testing aperture therein at a location proximate to one of the openings, and the fuel tank assembly includes a cap removably attachable to the shell to close the testing aperture.

8. The fuel tank assembly of claim 1, wherein the shell includes a generator mounting interface on a top side thereof.

9. The fuel tank assembly of claim 1, wherein the access panels and the shell are structured such that the access panels fluidly seal the openings while being removably connected to the shell to cover the openings.

10. The fuel tank assembly of claim 1, comprising a spacer disposed between the one or more fuel tanks and a bottom of the shell, the one or more fuel tanks being disposed on the spacer when inside the shell.

11. The fuel tank assembly of claim 10, wherein the spacer includes a rail comprising a friction-reducing material.

12. The fuel tank assembly of claim 10, wherein the spacer is sized to define a gap between the one or more fuel tanks and the bottom of the shell, the gap being dimensioned to receive a fork of a forklift therein when the access panels are in the open position.

13. A generator assembly, comprising:
   a shell including openings therein each permitting access to one of a plurality of fuel tank compartments within the shell, the fuel tank compartments spaced apart from each other within the shell;
   a generator disposed on top of the shell;
   access panels each connectable to the shell about one of the openings and movable between a closed position where the opening is closed and an open position where the opening is open; and
   one or more fuel tanks each disposed in the shell in one of the fuel tank compartments and underneath the generator, any leak from the one or more fuel tanks being configured to remain within the shell and separate from the generator, each fuel tank being slidably engaged with the shell, each fuel tank being operatively connected to the generator to supply fuel to the generator, each fuel tank is slidable out of the shell via one of the openings when the corresponding access panel is in the open position and each fuel tank is disconnected from the generator.

14. The generator assembly of claim 13, wherein:
   the openings, the access panels, and the one or more fuel tanks include a first opening, a first access panel, a first fuel tank, respectively;

the openings and the access panels include a second opening and a second access panel, respectively, the second access panel is connectable to the shell and movable between a closed position of the second access panel where the second opening is closed and an open position of the second access panel where the second opening is open; and the one or more fuel tanks include a second fuel tank disposed in the shell in another one of the fuel tank compartments and slidably engaged with the shell, the second fuel tank being operatively connected to the generator to supply fuel to the generator, the second fuel tank is slidable out of the shell via the second opening when the second access panel is in the open position and the second fuel tank is disconnected from the generator.

15. The generator assembly of claim 14, wherein the first opening is opposite the second opening, the first and second fuel tanks are dimensioned to define an access space therebetween when disposed in the shell, and the shell defines a top opening through a top of the shell that opens into the access space, the top opening being accessible while the generator is disposed on the top of the shell.

16. The fuel tank assembly of claim 1, wherein the fluid is diesel fuel.

* * * * *